(12) United States Patent
Bruinsma

(10) Patent No.: US 6,616,273 B1
(45) Date of Patent: Sep. 9, 2003

(54) ADDITION OF COPPER SALTS AND COPPER COMPLEXES TO THERMAL INKJET INKS FOR KOGATION REDUCTION

(75) Inventor: Paul J. Bruinsma, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/105,490

(22) Filed: Mar. 25, 2002

(51) Int. Cl.[7] .......................... G01D 11/00; C09D 1/00; C09D 11/00
(52) U.S. Cl. ..................................... 347/100; 106/31.95
(58) Field of Search ........................ 347/100; 106/31.95

(56) References Cited

U.S. PATENT DOCUMENTS

| | | | |
|---|---|---|---|
| 5,387,976 A | 2/1995 | Lesniak | 356/379 |
| 5,428,383 A | 6/1995 | Shields et al. | 347/96 |
| 5,635,969 A | 6/1997 | Allen | 347/96 |
| 5,706,042 A * | 1/1998 | Takeyama et al. | 347/100 |
| 5,746,818 A * | 5/1998 | Yatake | 106/31.86 |
| 6,059,868 A | 5/2000 | Kasperchik | 106/31.27 |
| 6,113,221 A * | 9/2000 | Weber | 347/612 |
| 6,234,613 B1 | 5/2001 | Feinn et al. | 347/65 |
| 6,425,659 B1 * | 7/2002 | Katsuragi et al. | 347/56 |
| 2002/0013842 A1 * | 1/2002 | Katsuragi et al. | 347/56 |
| 2002/0069789 A1 * | 6/2002 | Katsuragi et al. | 106/31.27 |

* cited by examiner

Primary Examiner—Judy Nguyen
Assistant Examiner—Michael S Brooke

(57) ABSTRACT

Copper salts and copper organic complexes are added to thermal inkjet inks, to deliver copper to a resistor surface where the copper ion aids in removal of koga.

16 Claims, 3 Drawing Sheets

ADDITION OF COPPER SALTS AND COPPER COMPLEXES TO THERMAL INKJET INKS FOR KOGATION REDUCTION

TECHNICAL FIELD

The present invention is directed thermal ink jet inks, and, more particularly, to the reduction of kogation on the resistor surface by the addition of copper-containing ions to the ink.

BACKGROUND ART

Small drop volumes, on the order of 10 picoliters (pl) or less, are advantageous for superior image and text quality. Smaller drops of ink on the paper (dots) are less visible and give printed images less of a grainy appearance. Because the colorant is in smaller "units", then gradients in color tones are more continuous. Because individual dots are less visible, color text is also improved with smaller drops.

Long-life thermal inkjet print heads with replaceable ink supplies provide value to the customer because the need to replace expensive to manufacture print heads is minimized or eliminated. Replaceable ink supplies can be in the form of, but not limited to, off-axis ink reservoirs or ink tanks that snap onto the top of the print heads.

Formulation of a color ink set for a printer with small drop volume, superior color image and text quality, long-life print heads, and high throughput is a challenge. Smaller drop volume means more drops need to be fired for a given volume of ink and the temperature of the resistor surfaces of the small drop volume pens tend to be higher. Therefore, kogation is more of a problem. In limited life print heads, which are replaced with the ink supply ("on-axis"), the print head can be replaced before kogation builds up to the point where it affects color image and text quality. In long-life print heads with replaceable ink supplied ("off-axis"), resistors must withstand hundreds-of-millions up to tens-of-billions of firings without kogation buildup.

Kogation is thought to be a complex process in which organic material, typically dyes, in the ink forms a graphitic film that builds up on the resistor surface during repeated ejection of drops. The koga can also be inorganic in nature but these types of koga are outside of the range of discussion here. Along with the buildup process, removal processes are also thought to occur that help to clean the resistor surface. These removal processes can include mechanical breakup and chemical oxidation of the koga. Mechanical breakup during the stresses of drop generation and vapor bubble collapse is not necessarily desirable because a rough koga surface can result that act as a "boiling chip". The rough surface provides may low-energy nucleation sites for drive bubble formation early in the resistor pulse cycle. These premature vapor bubbles are associated with weak and erratic drop velocities and weights. More consistent and strong drop velocities and weights are associated with delayed drive bubble formation from smooth resistor surfaces.

Because of conductive heat dissipation away from the resistor, there is a sharp temperature gradient or profile on the resistor surface with the highest temperature in the center of the resistor and lower temperatures towards the perimeter. The temperature gradient is revealed by the heavier koga or tantalum oxidation in the center "hot spots" of the resistors after several million firings.

Metal ions can have a strong influence on kogation. Metal ions can be introduced into thermal inkjet inks through: (1) impurities and contamination in ink manufacture; (2) corrosion of metal parts in ink filling equipment; (3) corrosion of metal parts within the thermal inkjet pen such as stainless-steel springs and screens; (4) deliberate addition of metal salts or metal-organic complexes for, e.g., controlling bleed; and (5) metallized dyes, such as copper phthalocyanines.

Kogation is also strongly affected by the metal type.

There remains a need for a process of eliminating, or at least reducing, kogation on the firing resistor of an inkjet print head.

DISCLOSURE OF INVENTION

In accordance with the present invention, a thermal inkjet ink for inkjet printing is provided, the ink comprising at least one colorant and a vehicle. The inkjet ink is provided with a copper ion concentration within a range of about 30 to 1,000 ppm, based on the total ink composition.

The presence of the copper ion reduces kogation, and is especially effective in inkjet pens that either jet low drop volumes ($\leq 10$ picoliters) or have a prolonged resistor life, such as off-axis print cartridges.

BEST MODES FOR CARRYING OUT THE INVENTION

Reference is now made in detail to a specific embodiment of the present invention, which illustrates the best mode presently contemplated by the inventor for practicing the invention. Alternative embodiments are also briefly described as applicable.

Figure 1:
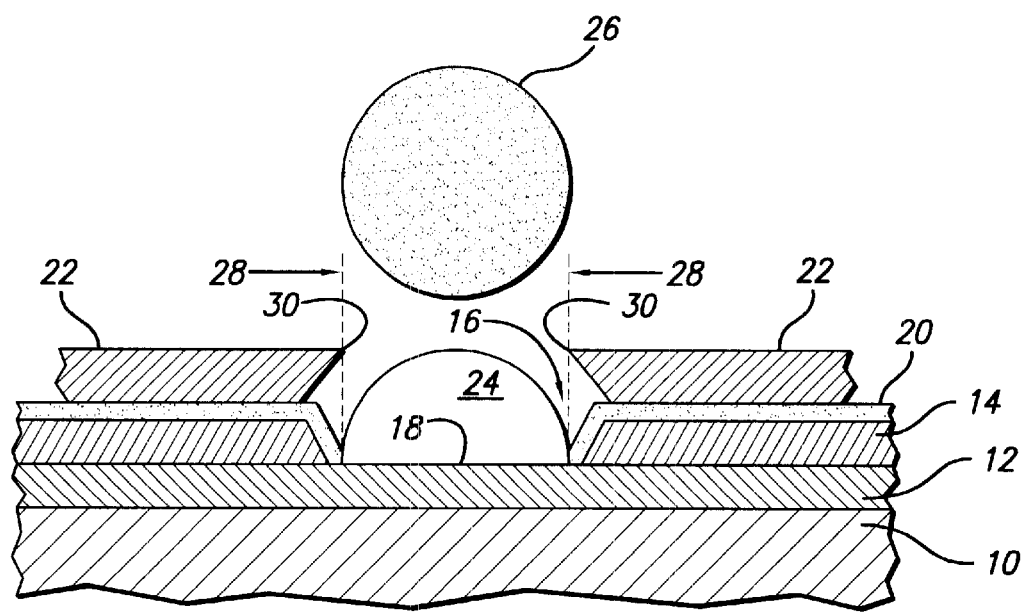
FIG. 1 is a cross-sectional view of a conventional inkjet print head, including a firing resistor.

FIG. 1 is a partial view of the print head of a thermal inkjet printer and illustrates an ink bubble on the surface of a firing resistor and the projected path of the ink drop (after explosive bubble formation) through the orifices found on the orifice plate of the inkjet printer. Specifically, in FIG. 1, resistor substrate 10 contains resistor 12 and conductor 14. Conductor 14 is etched to form depression 16 whose bottom 18 is the resistor 12. Optionally, the surface of the conductor 14 is covered with a passivation layer (not shown) which is generally a metal, such as gold. An aqueous ink composition 20, supplied from a reservoir (not shown), enters into the resistor area 18 along the surface of the conductor 14. Optionally, the print head can contain more than one depression 16, which depressions can be separated by the use of barrier layers (not shown) which extend between conductor 14 and orifice plate 22. Suitable barrier materials include Vacrel, which is commercially available from DuPont de Nemours & Co. (Wilmington, Del.).

When the resistor 12 is heated, an ink bubble 24 will form on the surface of the ink 20. In general, ink bubble 24 forms by passing a pulse or pulses of electric current through the resistor 12. Typically, sufficient current is pulsed through the resistor 12 so as to quickly raise the temperature of the ink in the depression 16 to near its superheat limit (e.g., about 300° to 400° C.) in about 1 to 30 microseconds. Under these conditions, the probability of homogeneous nucleation of a vapor bubble within the ink approaches unity. Such vapor bubble formation results in expulsion of an ink drop 26 along path 28—28 and through the orifice 30 formed in the orifice plate 22 and onto a substrate, e.g., paper (not shown). Kogation occurs at the bottom surface 18 of the depression 16, namely, on the portion of the resistor 12 exposed to the ink 20.

The resistor 12 has a more complicated structure than shown in FIG. 1, which is intended as an instructional aid. However, the omission of such details has no bearing on the present invention. Further, it will be appreciated that the formation of koga is not necessarily uniform across the surface of the resistor 12 in the depression 16, but is typically affected by the presence of a thermal gradient across the resistor.

Some metal ions may aid the oxidative removal of the koga. On the other hand, many divalent metal ions, especially calcium and magnesium, typically have only a relatively weak influence on kogation, primarily by decreasing dye solubility in the ink. Similarly, divalent copper ions are expected to only weakly decrease dye solubility.

In accordance with the present invention, the addition of copper ions, such as copper nitrate, to an otherwise kogating ink can almost completely remove the koga from the hotter portion of a tantalum resistor coating to leave a thin perimeter of koga on the more intermediate temperature part of the resistor. Copper(II), in contrast to calcium and magnesium, is a transition metal ion and has other oxidation states, especially the copper(I) form, which are accessible. Therefore, copper can participate in reduction-oxidation (redox) reactions. Without prescribing to any particular theory, it is believed that through this redox behavior, copper acts as a catalyst on the tantalum surface for the oxidative removal of the graphitic koga.

Copper is of environmental concern and either its concentration should be limited or the metal should be sequestered in an organic complex. In any event, a copper(II) salt or copper(II) organic complex is preferably employed in the practice of the present invention. The concentration of Cu(II) (as ion) ranges from about 30 to 1,000 ppm in the ink, preferably from about 50 to 200 ppm, based on the total ink composition.

Examples of Cu(II) salts include, but are not limited to, carbonate, chloride, chlorate, hydroxide, nitrate, nitrite, oxide, oxychloride, perchlorate, sulfate, and thiosulfate, and the hydrated forms thereof. Examples of Cu(II) organic complexes include, but are not limited to, acetate, acetylacetonate, citrate, formate, laurate, oleate, palmitate, salicylate, and tartrate, and the hydrated forms thereof.

The use of copper(II) ion to reduce kogation is especially efficacious in printers that jet low drop volumes ($\leq 10$ picoliters), called "low drop volume pens". Commercial examples of such a printer are Hewlett-Packard's DeskJet 2000C and 2200C printers. As explained above in the Background Art section, kogation has been found to be a problem with such low drop volume pens. In FIG. 1, the diameter of the orifice 30 is designed to be relatively small, on the order of 8 to 14 $\mu$m, to keep the drop volume at or below 10 pl; see, e.g., U.S. Pat. No. 6,234,613, entitled "Apparatus for Generating Small Volume, High Velocity Ink Droplets in an Inkjet Printer", issued to J. A. Feinn et al on May 22, 2001, and assigned to the same assignee as the present invention, the contents of which are incorporated herein by reference. As discussed in that reference, there are additional elements whose dimensions are also altered from those for jetting larger drop volumes. The point here is to illustrate one element that is employed in jetting small drop volumes.

The use of copper(II) ion to reduce kogation is also especially efficacious in printers that employ an off-axis reservoir. Such printers utilize replaceable reservoirs that are not part of the pen, as was the case with earlier printers. Commercial examples of such a printer are Hewlett-Packard's DeskJet 2000C and 2200C printers. As might be expected, long term use of such pens increases the likelihood of kogation on the resistors.

Figure 2:
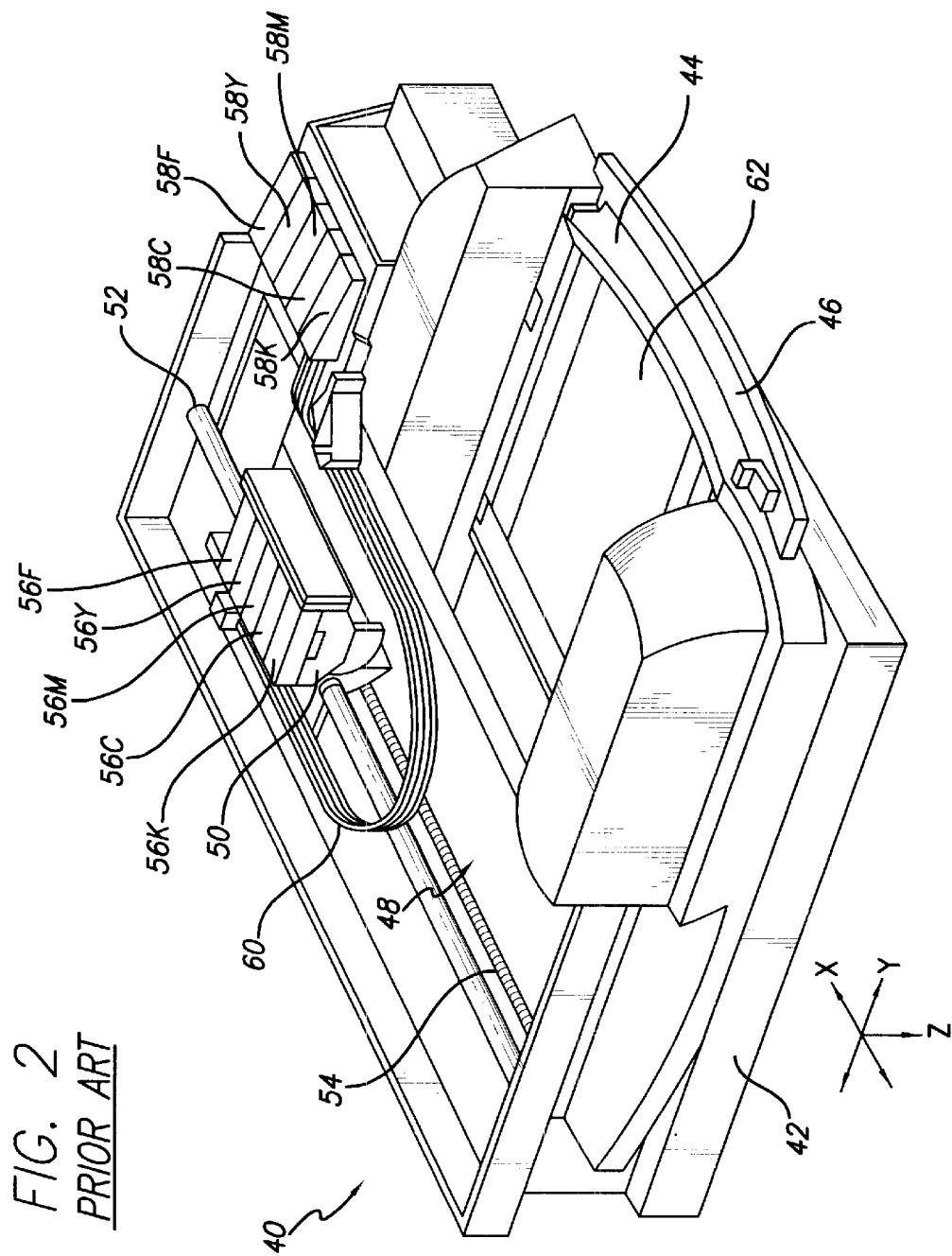
FIG. 2 is a perspective view of a generic off-axis ink jet printer of the type beneficially improved by the teachings of the present invention.

FIG. 2 depicts an example of an off-axis printer 40. A housing 42 encloses the electrical and mechanical operating mechanisms of the printer 40. Operation is administrated by an internal electronic controller (usually a microprocessor or application-specific integrated circuit ("ASIC") controlled printed circuit board) connected by appropriate cabling (not shown) to the computer. It is well-known to program and execute imaging, printing, print media handling, control functions, and logic with firmware or software instructions for conventional or general purpose microprocessors or ASICs. Cut-sheet print medium 44—referred to generically hereinafter simply as "paper," regardless of actual medium selected by the end-user—is loaded by the end-user onto an input tray 46. Sheets of paper 44 are then sequentially fed by a suitable, internal, paper-path transport mechanism (not shown) to an internal printing station platen, or "print zone," 48 where graphical images or alphanumeric text are created using state of the art color imaging and text rendering using dot matrix manipulation techniques. A carriage 50, mounted on a slider 52, scans the paper sheet 44 delivered to the print zone 48. An encoder strip 54 and appurtenant position encoding devices on the carriage 50 and as part of the controller are provided for keeping track of the position of the carriage 50 at any given time.

A set of individual ink-jet writing instruments, or "pens", 56K, 56C, 56M, 56Y, 56F, each having ink-jet printheads as would be known in the art (not seen in this perspective), are releasably mounted in fixed positions on the carriage 50 for easy access and repair or replacement. Each printhead mechanism is adapted for "jetting" minute droplets of ink or other fluids (see, e.g., U.S. Pat. No. 5,635,969, entitled "Method and Apparatus for the Application of Multipart Ink-Jet Ink Chemistry", issued to Allen and assigned to the common assignee of the present invention, the contents of which are incorporated herein by reference) to form dots on adjacently positioned paper in the print zone 48. Refillable or replaceable ink supply cartridges, or "reservoirs", 58K, 58C, 58M, 58Y are provided; generally, in a full color ink-jet system, inks for the subtractive primary colors, cyan, yellow, magenta (CYM) and a true black (K) ink are used; it will be appreciated, however, that additive primary colors—red, blue, green—or other colors can be used. In this set, a pen 56F and cartridge 58F for a clear fluid fixer "F" is also provided. The pens 56 are coupled to respective cartridges 58 by flexible tubing 60. Once a printed page is completed, the sheet of paper is ejected onto an output tray 62. It is common in the art to refer to the pen scanning direction as the x-axis, the paper feed direction as the y-axis, and the ink drop firing direction as the z-axis.

While four ink pens (CYMK) are shown, it will appreciated that the invention is not limited to the number of inks used. For example, a variation of the four pen CYMK print set is a six pen print set comprising light cyan, dark cyan, yellow, light magenta, dark magenta, and black. Such alternative variants may also be employed in the practice of the present invention.

Further, while one fixer (F) pen is shown, it will be appreciated that the invention is not limited to the number of fixer compositions used, nor the order of printing fixer and ink. For example, the fixer may be printed first, thereby forming an under-print, or the fixer may be printed last, thereby forming an over-print or over-coat, or one or more fixers may be both under-printed and over-printed. In this last instance, the fixer(s) may be the same or different in composition.

The inkjet inks that are beneficially employed in the practice of the present invention comprise a vehicle and at least one colorant.

In formulating the inkjet inks, one or more co-solvents may be employed in the vehicle. These co-solvents are substantially water-miscible. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, urea, 1,6-hexanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols. The co-solvent concentration may range from 0 to about 30 wt %, with about 3 to 15 wt % being preferred. The balance of the ink composition comprises water.

Any of the following dyes (water-soluble colorants) may be used in the practice of the present invention; however, this listing is not intended to limit the invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company.

Any of the following pigments (water-insoluble colorants) may also be used in the practice of the invention, alone or in combination with any of the aforementioned water-soluble dyes; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Chromophtal(® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permnanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, L75-2577 Yellow, YGD 9374 Yellow, YHD 9123 Yellow, YCD 9296 Yellow, YFD 1100 Yellow, QHD6040 Magenta, QFD1180 Magenta, RFD3217 Magenta, QFD1146 Magenta, RFD9364 Magenta, QFD9334 Magenta, BCD6105 Cyan, BCD9448 Cyan, BCD6060 Cyan, BFD5002 Cyan, BFD1121 Cyan, and LHD9303 Black. Additional pigments useful in the practice of the present invention include Pigment Blue 15, Pigment Blue 60, Pigment Yellow 74, Pigment Yellow 17, and Pigment Red 220.

A typical formulation for an ink useful in the practice of the present invention includes about 3 to 12 wt % of at least one water-miscible organic co-solvent, about 2 to 8 wt % of the colorant, and the balance water.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffering agents may be used to control the pH of the ink. The concentration of the sequestering agent(s), if used, is(are) in the range of 0.01 to 2 wt %. Other known additives such as viscosity modifiers and other acrylic or nonacrylic polymers may be added to improve various properties of the ink compositions as desired, such as conditioning the ejected ink droplets. The concentration range of the additive(s) is from 0 to 5 wt % of the total ink composition.

In the fabrication of the ink, the above-mentioned ingredients are combined and stirred mechanically or mixed using low power sonication.

EXAMPLES

Example 1

This example demonstrates that copper(II) nitrate salt added to a kogating ink is observed to remove the koga from the hot spot of the resistor to leave only a perimeter of koga. The basic ink formulation is listed in Table I below.

TABLE I

Ink Formulation A

| Component | Concentration |
| --- | --- |
| M377 Ilford dye | 0.10 absorbance units at 1:10,000 dilution |
| Copper phthalocyanine dye | 0.12 absorbance units at 1:10,000 dilution |
| 2-pyrrolidinone | 8% |
| 1,5-pentanediol | 8.75% |
| EHPD* | 1.88% |
| Dowfax 8390 | 1% |
| succinic acid | 1.85% |
| TERGITOL 15-S-5 | 0.94% |
| TERGITOL 15-S-7 | 0.56% | note:
EHPD = ethylhydroxypropanediol

Figure 3A:
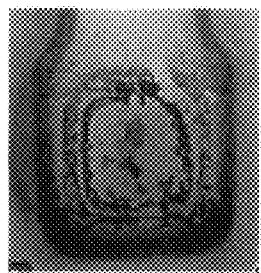
FIGS. 3a–3c are microphotographs of images of resistors fired 100 million times with ink that contains 1.8 mM of (a) copper nitrate, (b) magnesium nitrate, and (c) sodium nitrate.
Figure 3B:
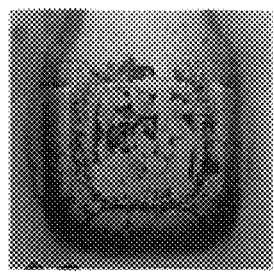
Figure 3C:
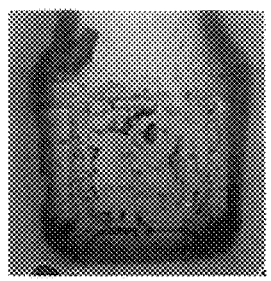

FIGS. 3a–3c depict top plan view microphotographs of a resistor 12 fired 100 million times with ink comprised of 1.8 mM of copper nitrate (FIG. 3a), magnesium nitrate, (FIG. 3b), and sodium nitrate (FIG. 3c). 1.8 mM copper nitrate is approximately equivalent to 100 ppm of copper.

Because of the variable parasitic resistances from pen-to-pen, the energy delivered to the resistors was not necessarily consistent from pen-to-pen. Therefore, the total amount of koga between resistors in FIGS. 3a–3c is not reliable. What is stressed is the difference in koga between the center and the outer part of the resistor's hot spot. The circular ring on the resistor fired with copper-spiked ink (FIG. 3a) indicates the koga is "burned away" from the hotter center part of the resistor.

Example 2

Figure 4A:
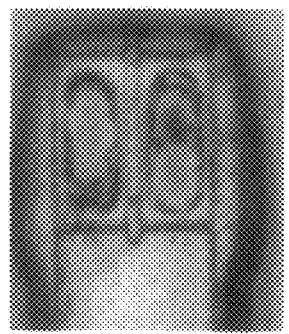
FIGS. 4a–4b are microphotographs of images of resistors fired 100 million times (a) with ink containing 100 ppm copper and (b) with ink not containing copper.
Figure 4B:
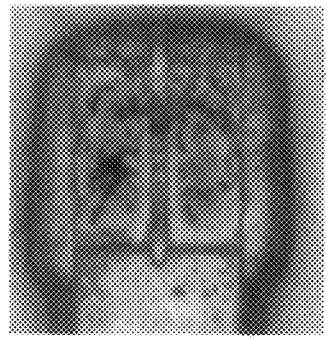

This example shows the koga-removal effect of copper is concentration-dependent and decreases below 30 ppm. Copper nitrate was added in different amounts to ink formulation A (see Example 1) to yield inks with 100, 30, 10, 3, 1, and 0 ppm copper. Sets of resistors in the pens supplied with these inks were fired 25, 50 and 100 million drops per resistor and the resistor surfaces were observed under a light microscope. The observations of koga on the center, hot spot of the resistor are summarized in Table II below. Differences between the koga with 100 ppm copper and without copper are illustrated in FIGS. 4a–4b. The differences in koga distribution between the center areas and outer parts of the resistors 12 are clearly seen. There is less koga on the hot spots of the resistor fired with the copper-spiked ink.

TABLE II

Resistor Observations

| Copper Concentration (ppm) | Koga on the Hot Spot |
| --- | --- |
| 100 | no koga |
| 30 | light koga |
| 10 | moderate koga |
| 3 | moderate koga |
| 1 | moderate koga |
| 0 | moderate koga |

FIGS. 4a–4b depict a top plan view microphotograph of resistors 12 fired 100 million times with ink spiked with 100 ppm Cu (FIG. 4a) and with ink not spiked with copper (FIG. 4b). The Figures clearly show the improvement in reduced kogation with the presence of copper ion.

INDUSTRIAL APPLICABILITY

The addition of copper ion to thermal inkjet inks, is expected to find use for reducing kogation in such inks.

What is claimed is:

1. A thermal inkjet ink for inkjet printing comprising at least one colorant and a vehicle, said inkjet ink provided with a copper ion concentration within a range of about 50 to 200 ppm, based on the total ink composition, wherein said copper ion is copper(II).

2. The thermal inkjet ink of claim 1 wherein said copper ion concentration is provided by at least one copper-containing species selected from the group consisting of copper salts and copper organic complexes.

3. The thermal inkjet ink of claim 2 wherein said copper salt comprises at least one copper(II) salt selected from the group consisting of carbonate, chloride, chlorate, hydroxide, nitrate, nitrite, oxide, oxychloride, perchlorate, sulfate, and thiosulfate, and the hydrated forms thereof.

4. The thermal inkjet ink of claim 2 wherein said at least one copper organic complex comprises at least one copper (II) organic complex selected from the group consisting of acetate, acetylacetonate, citrate, formate, laurate, oleate, palmitate, salicylate, and tartrate, and the hydrated forms thereof.

5. In combination, (a) a low drop volume thermal inkjet pen for jetting ink drops having a volume of 10 picoliters or less and (b) a thermal inkjet ink for inkjet printing comprising at least one colorant and a vehicle, said inkjet ink provided with a copper ion concentration within a range of about 50 to 200 ppm, based on the total ink composition, wherein said copper ion is copper(II).

6. The combination of claim 5 wherein said copper ion concentration is provided by at least one copper-containing species selected from the group consisting of copper salts and copper organic complexes.

7. The combination of claim 6 wherein said copper salt comprises at least one copper(II) salt selected from the group consisting of carbonate, chloride, chlorate, hydroxide, nitrate, nitrite, oxide, oxychloride, perchlorate, sulfate, and thiosulfate, and the hydrated forms thereof.

8. The combination of claim 6 wherein said at least one copper organic complex comprises at least one copper(II) organic complex selected from the group consisting of acetate, acetylacetonate, citrate, formate, laurate, oleate, palmitate, salicylate, and tartrate, and the hydrated forms thereof.

9. In combination, (a) a prolonged resistor life thermal inkjet pen for jetting ink drops, said thermal inkjet pen supplied with ink from a separate off-axis reservoir, and (b)

a thermal inkjet ink for inkjet printing comprising at least one colorant and a vehicle, said inkjet ink provided with a copper ion concentration within a range of about 50 to 200 ppm, based on the total ink composition, wherein said copper ion is copper(II).

10. The combination of claim 9 wherein said copper ion concentration is provided by at least one copper-containing species selected from the group consisting of copper salts and copper organic complexes.

11. The combination of claim 10 wherein said copper salt comprises at least one copper(II) salt selected from the group consisting of carbonate, chloride, chlorate, hydroxide, nitrate, nitrite, oxide, oxychloride, perchlorate, sulfate, and thiosulfate, and the hydrated forms thereof.

12. The combination of claim 10 wherein said at least one copper organic complex comprises at least one copper(II) organic complex selected from the group consisting of acetate, acetylacetonate, citrate, formate, laurate, oleate, palmitate, salicylate, and tartrate, and the hydrated forms thereof.

13. A method of reducing kogation in a thermal inkjet ink for inkjet printing comprising at least one colorant and a vehicle, said method comprising adding to said inkjet ink at least one copper-containing species to provide said inkjet ink with a copper ion concentration within a range of about 50 to 200 ppm, based on the total ink composition, wherein said copper ion is copper(II).

14. The method of claim 13 wherein said at least one copper-containing species is selected from the group consisting of copper salts and copper organic complexes.

15. The method of claim 14 wherein said copper salt comprises at least one copper(II) salt selected from the group consisting of carbonate, chloride, chlorate, hydroxide, nitrate, nitrite, oxide, oxychloride, perchlorate, sulfate, and thiosulfate, and the hydrated forms thereof.

16. The method of claim 14 wherein said at least one copper organic complex comprises at least one copper(II) organic complex selected from the group consisting of acetate, acetylacetonate, citrate, formate, laurate, oleate, palmitate, salicylate, and tartrate, and the hydrated forms thereof.

* * * * *